United States Statutory Invention Registration [19]

[11] Reg. Number: H108

Gerlach [45] Published: Aug. 5, 1986

[54] RADAR DOPPLER PROCESSOR USING A FAST ORTHOGONALIZATION NETWORK

[75] Inventor: Karl Gerlach, Dunkirk, Md.

[73] Assignee: The Government of the United States, Washington, D.C.

[21] Appl. No.: 786,982

[22] Filed: Oct. 15, 1985

[51] Int. Cl.[4] ..... G01S 13/28

[52] U.S. Cl. ..... 343/5 FT; 343/5 LE

[56] References Cited

U.S. PATENT DOCUMENTS 4,190,895 2/1980 Davis ..... 364/815

4,459,592 7/1984 Long ..... 343/7 A

OTHER PUBLICATIONS

Gerlach, NRL Report 8840 "Multiple channel adaptive filtering using a fast orthogonalization network: an application to efficient pulsed doppler radar processing", dated Sep. 28, 1984.

*Primary Examiner*—Thomas H. Tarcza

*Assistant Examiner*—Bernarr E. Gregory

*Attorney, Agent, or Firm*—Robert F. Beers; William T. Ellis

[57] ABSTRACT

A radar doppler processor, comprising M, M=N−1, tap delay lines; N digital multipliers; a N-point fast fourier transform network; and a fast orthogonalizing network to orthogonalize each subband output signal to eliminate cross-correlations between all output signals.

2 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADAR DOPPLER PROCESSOR USING A FAST ORTHOGONALIZATION NETWORK

BACKGROUND OF THE INVENTION

The present invention relates generally to methods and circuits for suppressing radar output due to clutter while retaining desired output due to targets that are moving with velocities different than those of clutter. More specifically, the present invention relates to radar doppler filters using adaptive filtering and a fast orthogonalization network.

The detection of moving targets by a radar system is often limited by echoes from very large stationary objects, as well as by receiver noise. The returns from stationary objects, referred to as clutter, are usually discriminated from returns from moving targets through velocity filtering techniques designed to maximize signal-to-clutter ratio (SCR). The effects of receiver noise are usually reduced through the use of coherent or noncoherent integration designed to maximize signal-to-noise ratio (SNR). To maximize the detectability of moving targets, the radar should be designed to reject simultaneously clutter plus noise, that is to maximize the signal-to-interference ratio (SIR) when the total interference consists of clutter plus noise.

Adaptive filtering can be applied to radar doppler filter design. Doppler filters are designed to accept doppler frequency shifted moving targets while rejecting the returns from the target background (clutter). The clutter is usually slow moving so that its energy is normally concentrated about the zero doppler frequency. A bank of filters is used to cover the entire doppler band; i.e. the doppler band is equally divided into subbands. Ideally, it would be desirable to place a rectangular bandpass filter about each subband so that the large clutter return is completely rejected out of band. However, only approximations of this rectangular filter are realizable. It has been shown that adaptive doppler processing yields superior signal-to-clutter power ratio improvement performance over these approximate rectangular filter implementations. This results because each doppler filter is designed not only to accept a desired signal but also to place nulls at frequencies out of band where clutter returns exist. Each doppler filter is optimized with respect to the doppler filter's allocated subband using an adaptive algorithm.

If the radar clutter spectrum is known apriori, then it is possible to design the optimum doppler filters apriori. However, in some cases, for instance radar rain clutter, it may be necessary to adapt these doppler filters to the dynamic radar clutter. Thus, the radar clutter spectrum is estimated on line and this knowledge is used to develop the optimal weighting on each of the doppler filters.

The direct adaptive filtering of multiple input channels by Gram-Schmidt orthogonalization has been the subject of intense research during the past decade. The Gram-Schmidt technique (sometimes called the Adaptive Lattice Filter) has been shown to yield superior performance simultaneously in arithmetic efficiency, stability, and convergence times over other adaptive algorithms.

In adaptive filtering, it is desirable to find the optimal weighting of multiple input channels such that the output signal to noise power ratio (S/N) is a maximum. The desired signal is associated with a desired signal column vector, s, where $s=(s_1,s_2 \ldots, s_n)^T$, N is the number of input channels, and T denotes the Vector transpose. The vector component, $s_n, n=1,2 \ldots, N$ represents the desired signal's component in the nth input channel. If w is an N-length column vector denoting the optimal weighting of the N input channels and x is an N-length column vector denoting the data from the N input channels, then it can be shown that w must satisfy the following vector equation:

$$R_{xx}w=\mu s^*, \tag{1}$$

where $$R_{xx}=E(x^*x^T), \tag{2}$$

$\mu$ is an arbitrary constant which for convenience we set equal to one, E(·) denotes the expected value, and * denotes the complex conjugate. Equation 1 is often referred to as the Applebaum Adaptive Algorithm. The matrix, $R_{xx}$, is called the input covariance matrix.

For some filtering applications, there may be as many output channels as there are input channels (such as a doppler processor). Hence, there will be N desired signal vectors. Defining S to be the N×N steering matrix of desired signal vectors; i.e., $$S=(s_1, s_2, \ldots, s_N) \tag{3}$$

where $s_n$, $n=1, 2, \ldots, N$ are column vectors of the desirable signals. If W is defined as the optimal N×N weighting matrix, i.e., the weights that optimize the S/N in each of the output channels, then these weights satisfy the following matrix equation $$R_{xx}W=S^*. \tag{4}$$

Problems occur in the solution for the weights if $R_{xx}$ is ill conditioned. Due to computational inaccuracies, the algorithm can become unstable and the output channels extremely noisy.

OBJECTS OF THE INVENTION

Accordingly, it is an object of the present invention to provide an arithmetically efficient adaptive pulse doppler radar processor.

It is a further object of the present invention to reduce algorithm numerical instability and output channel noise in an adaptive pulse doppler radar processor.

Other objects, advantages, and novel features of the present invention will become apparent from the detailed description of the invention, which follows the summary.

SUMMARY OF THE INVENTION

Briefly, the above and other objects are realized by a radar doppler processor comprising M, M=N−1, Tap delay lines, for obtaining a set of N consecutive samples of a radar echo signal input, sampled at a rate of the radar system's pulse repetition rate; N digital multipliers to apply a weighting function, $1/a_n$, to each of the N consecutive samples, wherein $$a_n = \frac{\operatorname{Sin}\left[\frac{\pi}{N}\left(n - \frac{N+1}{2}\right)\right]}{\frac{\pi}{N}\left(n - \frac{N+1}{2}\right)}, \; n = 1, 2, \ldots, N; \tag{5}$$

a N-point fast fourier transform network for dividing the weighted samples into a set of doppler frequency subband signals and generating a separate subband output signal for each of the subbands; and a fast orthogonalizing network to orthognalize each subband output signal to eliminate cross-correlations between all output signals.

DETAILED DESCRIPTION OF THE PREFERRED EMBODIMENT

Figure 1:
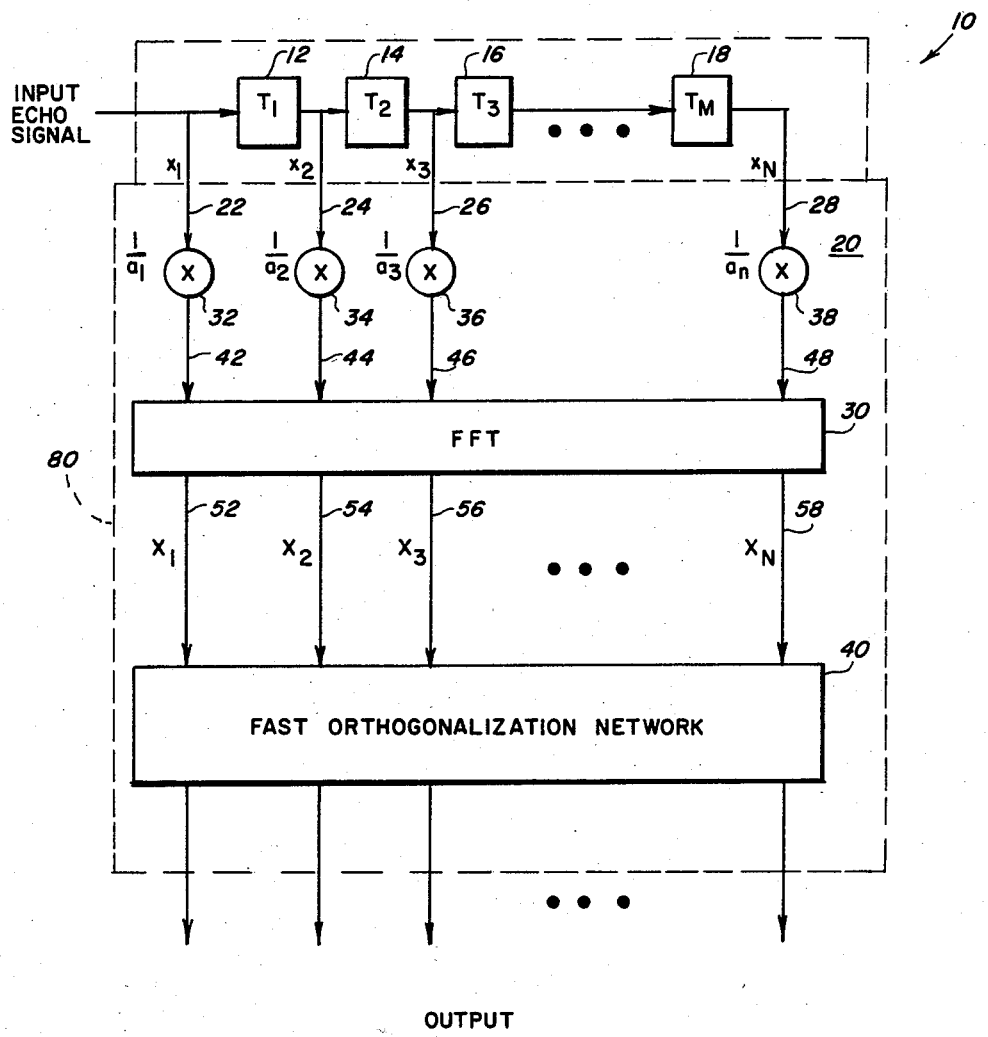
FIG. 1 is a schematic block diagram of one embodiment of the present invention.

Referring now to the Figure, there is disclosed a schematic block diagram of the radar doppler processor system of the present invention. The system comprises a M, M=N−1, tap delay line 10 for obtaining a set of N consecutive samples of a radar echo signal input, sampled at a rate of the radar system's pulse repetition rate; N digital multipliers 20 to apply a weighting function, $1/a_n$, to each of the N consecutive samples; a N-Point Fast Fourier Transform Network 30 for dividing the weighted samples into a set of doppler frequency subband signals and generating a separate subband output signal for each of the N subbands; and a fast orthogonalizing network 40 to orthogonalize each of the subband output signals to eliminate cross-correlations between all output signals.

In a preferred embodiment, $x_n$, n=1, 2, . . ., N, input channels of data are formed and captured by taking time-delayed samples of a radar input echo signal on a M, M=N−1, tap delay line 10. In this context, the radar's doppler space extends from 0 frequency to the radar's pulse repetition rate. Targets moving away from or toward the radar position will cause a phase shift (doppler frequency) between two adjacent radar echo pulses. This phase shift is equal to $2\pi F_d T$, where $F_d$ is the doppler frequency, and T is the pulse repetition period for the radar. If the phase shift resulting from the target doppler frequency equals 0 or $2\pi$ and the radar echoes are a constant, then it will cancel with the next adjacent echo pulse, as if no doppler frequency space is generally defined within the range 0 and $2\pi$. The delay line 10 includes M, M=N−1, delay blocks 12, 14, 15 and 18, each set to provide a delay of the radar interpulse period T. Then, the signal is tapped before the first delay block 12 and after each of the delay blocks 12, 14, 16 and 18, in order to obtain N individual samples. These N samples are provided on respective output lines 22, 24, 26 and 28, to N digital multipliers 32, 34, 36 and 38. Each digital multiplier applies a weighting function, $1/a_n$, to each delayed sample of the input echo signal on lines 22, 24, 26 and 28 to taper the delayed samples. Tapering may be achieved by a variety of weighting techniques. Such techniques include uniform weighting, Hamming weighting, Barlett weighting and Blackman weighting and may be realized by networks of the type described in Oppenhein and Schafer, *Digital Signal Processing*, Chapter 5, Prentice-Hall Book Company, 1975. These N weighted samples are provided on respective output lines 42, 44, 46 and 48 to FFT filter network 30.

The FFT filter network 30 may be realized by a conventional FFT filter network of the type described in Oppenheim and Schafer, *Digital Signal Processing*, Chapter 6, Prentice Hall Book Company, 1975.

The N outputs of Fast Fourier Transform network 30 on output lines 52, 54, 56 and 58 are inputed via corresponding input lines to a Fast Orthogonalization network 40 to orthogonalize each of the subband output signals $X_1, X_2, \ldots, X_N$ to eliminate cross-correlations between all output signals $X_1, X_2, \ldots, X_N$.

By orthogonalizing the input channels of the system with respect to each other, the input channels are made independent of each other. Great advantages result from channel independence. Every channel only carries information it is supposed to; the channel does not prossess any information that is supposed to be carried by another channel. Consequently no cross-correlations exist in the channel that has to be considered during manipulation of the information in the channel, thus allowing for simpler and less expensive circuits. Moreover, greater accuracy concerning the information a channel is carrying is achieved.

The decorrelation is achieved by generating a root structure of N inputs having input order 1 to N where $2^{m-1} < N \leqq 2^m$ and m is an integer $\geqq 1$ inverting the order of the root structure to generate a structure having input order N to 1; partially orthogonalizing the root structure and the inverted structure to remove inputs common to their first $2^{M-I}$ inputs, where I=1; splitting off two substructures from the root structure where the first substructure has input order 1 to $2^{M-I}$ and the second substructure has input order $2^{M-I}$ to 1, where I=1; splitting off two substructures from the inverted structure, where the first substructure has input order $2^M$ to $2^{M-I}$ and the second substructure has input order $2^{M-I}$ to $2^M$, where I=1, partially orthogonalizing each of the substructures to remove inputs common to their first $2^{M-I}$ inputs, where I equals 2; repeating the splitting off steps and the partially orthogonalizing steps until only 1 input remains, where, for each repetition the substructures that are split-off are treated as a new root structure and a new inverted structure and the value identified for I in each step is increased by 1. For a full discussion, see 68,331, Ser. No. 6-761648, filed Aug. 2, 1985.

In operation of the embodiment shown in the figure, the input channels, $x_n$, n=1, 2, . . . , N, are found by taking time delayed samples (usually one pulse repetition interval (PRI)). Hence if r(t) is the received radar echo signal then $$x_n = r(t - nT),\ n = 1, 2, \ldots, N. \tag{6}$$

There are N weights associated with each of the N doppler filters and hence $N^2$ weights are associated with all the doppler filters. These $N^2$ weights can be written in matrix form and are the solution of the following matrix equation:

$$R_{xx}W = S^* \tag{4}$$

where $R_{xx}$ is the covariance matrix of the N input channels and W are the desired weights. If the input data is statistically stationary in time than $R_{xx}$ will be a Toeplitz matrix. The matrix S is the matrix of steering vectors signifying the various doppler filter subbands. In general, the steering matrix has the following form:

$$S = \begin{vmatrix} a_1 & a_1 & a_1 & \ldots & a_1 \\ a_2 & a_2 \Gamma_N & a_2 \Gamma_N^2 & \ldots & a_2 \Gamma_N^{2(N-1)} \\ a_3 & a_3 \Gamma_N^2 & a_3 \Gamma_N^{(2)(2)} & \ldots & a_3 \Gamma_N^{2(N-1)} \\ \cdot & \cdot & \cdot & \cdot & \cdot \\ \cdot & \cdot & \cdot & \cdots & \cdot \\ \cdot & \cdot & \cdot & \cdot & \cdot \\ a_N & a_N \Gamma_N^{N-1} & a_N \Gamma_N^{2(N-1)} & \ldots & a_N \Gamma_N^{(N-1)(N-1)} \end{vmatrix} \tag{7}$$

where $\Gamma_N = \exp(-j\ 2\pi/N)$ and $j = \sqrt{-1}$. For the Brennan and Reed Algorithm, $a_n = 1$, $n = 1, 2, \ldots, N$. For this algorithm, each of the N doppler filters is optimized at one particular doppler frequency using the Applebaum algorithm. The particular doppler frequency is chosen to be at the center of the given subband. However, because in general the doppler shift is unknown within a given subband, any desired signal whose doppler is not at the center of one of these subbands will not be properly matched and signal detection will degrade especially at dopplers that are close in to the clutter spectrum.

A steering matrix which gives superior performance was devised by Andrews. For this algorithm the doppler shift is assumed unknown across a particular subband, and the filter response is optimized over the entire subband. In essence, the best N-point finite impulse response (FIR) filter is fitted to a desired rectangular filter centered in a particular subband with a phase band width of $2\pi/N$. Andrews shows that these weights are given by $$a_n = \frac{\sin\left[\frac{\pi}{N}\left(n - \frac{N+1}{2}\right)\right]}{\frac{\pi}{N}\left(n - \frac{N-1}{2}\right)},\ n = 1, 2, \ldots, N. \tag{5}$$

Assume that the steering matrix as seen in Eq. 4, S, is nonsingular. We configure a multichannel processor as seen in FIG. 5. The original input data column vector, x, is multiplied by the matrix inverse of S* to form another column vector, X, which is also a multi-channel process. Let W be the optimal weighting matrix of X such that the S/N's associated with each of the desired signals channels in maximized. It can be shown that W' satisfies the following matrix equation $$R_{xx}W' = 1 \tag{8}$$

where $R_{xx}$ is defined by (2). Actually $$R_{xx} = S_*^{-1} R_{xx} S^{-1} \tag{9}$$

where * denotes conjugate transpose. The steering matrix, S, has been transformed into a steering matrix which is the identity matrix.

By examining the new desired signal vectors (which are the column vectors of the identity matrix), the n'th channel has a desired signal vector:

$$(00 \ldots 0\underset{\substack{\uparrow \\ n\text{'th position.}}}{1}00 \ldots 0)^T$$

Hence, it is seen that the form of (8) for the n'th channel is very similar to Eq. (1). However, in order to perform the decorrelation process, it is only necessary to rearrange the input channels so that all other channels are decorrelated with the n'th channel. Each channel is in turn orthogonalized from all other channels. For this a Fast Orthogonalization Network which was previously described is used.

The form of S as given by (7) is such that S* can be factored as $$S^* = AB \tag{10}$$

where A is a diagonal matrix with diagonal elements, $a_n^*$, $n = 1, 2, \ldots, N$ and $$B = (\Gamma_n^{-(n-1)(l-1)});\ n, l = 1, 2, \ldots, N. \tag{11}$$

By employing a multiple channel adaptive lattice filter using a FON the N input data channels, $x_1, x_2, \ldots, x_N$, are transformed by $S^{*-1} = B^{-1}A^{-1}$. Due to the special form of the matrix, B, it can be shown that $$B^{-1} = B^*. \tag{12}$$

Therefore, the N output channels, $X = (X_1, X_2, \ldots, X_N)^T$, that result by multiplying the N input channels by S*−1 are given by $$x = B^* A^{-1} x. \tag{13}$$

Equation (13) indicates that the input data channels, x, are first weighted by the inverse of the diagonal matrix A, which is equivalent to weighting the n'th channel by $1/a_n$, $n = 1, 2, \ldots, N$. The weighted channels are then multipled by the matrix, B*. It can be shown that the transformation that results by multiplying a set of N channels by B* can be implemented using a Fast Fourier Transform (FFT) if $N = 2^m$. It should be noted that the output channels of the FFT are no longer stationary with respect to each other; i.e. $R_{xx}$ is not a Toeplitz matrix. The N outputs of the FFT are then processed using the Fast Orthogonalization Network as disclosed. A simplified diagram of this processor is shown in the Figure.

Figure 2:
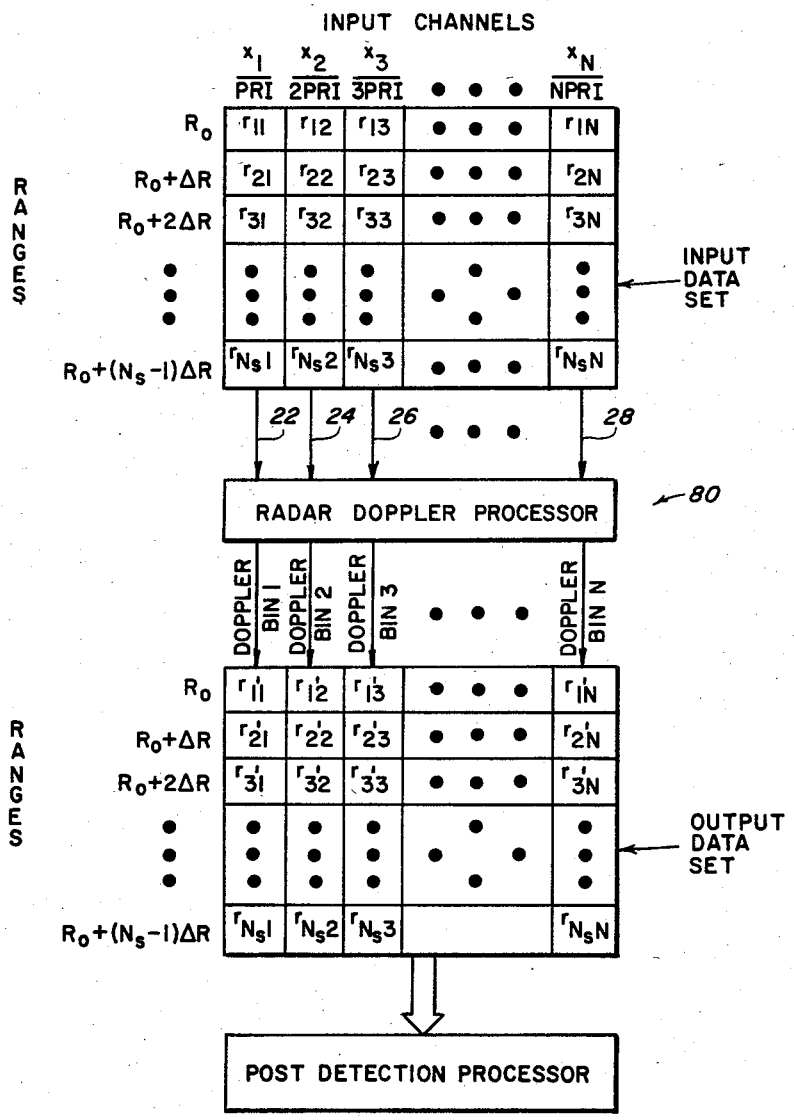
FIG. 2 is a schematic block diagram of the input and output data sets for the present invention.

The input data set has the form depicted in FIG. 2. Here the input data are arranged so that the returns from sequential range cells are sequential samples of a given channel and the data in each channel at a given range are the time-delayed (one PRI) return of the preceding channel. In this figure, there are $N_s$ range bins with $R_o$ the minimum range considered and $\Delta R$ is the range resolution. Returns from a given range bin occur one per PRI time step. If N PRIs are in the processing time window, then the returns in the nth PRI form the nth input channel; i.e., $r_{mm}$ is the radar return from the mth range cell in the nth PRI interval. If this input data set is block processed by using the adaptive doppler processor 80 as seen in FIG. 1, then the output data set will have the form depicted in FIG. 2. This matrix of output data will have elements, $r_{nm}$, corresponding to the returns in a given range-doppler bin. If blocks of input data are sequentially processed, then the resultant output data sets can be inputted into a postdetection processor for the detection and tracking of targets.

The advantages of the invention over the prior art are that by using a FON dynamic clutter (such as rain) can be rejected and hence real targets detected and the FON implementation is numerically more stable than the prior art method of solving for the optimal weights: the Sample Matrix Inversion Algorithm.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. A radar doppler processor using a fast orthogonalization network, comprising:

a radar echo signal input;

M, M=N−1, Tap delay lines, for obtaining a set of N consecutive samples of said radar echo signal input, sampled at a rate of the radar system's pulse repetition rate;

N digital multipliers to apply a weighting function, $1/a_n$, to each of said N consecutive samples, wherein $$a_n = \frac{\sin\left[\frac{\pi}{N}\left(n - \frac{N+1}{2}\right)\right]}{\frac{\pi}{N}\left(n - \frac{N+1}{2}\right)}, \quad n = 1, 2, \ldots, N;$$

a N-point Fast Fourier Transform network for dividing the weighted samples into a set of doppler frequency subband signals and generating a separate subband output signal for each of the subbands; and a fast orthogonalizing network to orthogonalize each of said subband output signals to eliminate cross-correlations between all output signals.

2. A method of implementing a matched clutter filter in a dynamic signal environment, comprising the steps of:

sampling the input radar echo signal at the system pulse repetition rate to obtain a set of N consecutive samples;

weighting said N consecutive samples;

Fast fourier transforming said weighted samples into a set of doppler frequency subband signals; and orthogonalizing the set of doppler frequency subband signals to eliminate cross-correlations between all signals.

* * * * *